(12) United States Patent
Fan

(10) Patent No.: US 9,594,209 B2
(45) Date of Patent: Mar. 14, 2017

(54) BACKLIGHT MODULE AND DISPLAY DEVICE

(71) Applicant: Shenzhen China Star Optoelectronics Technology Co., Ltd., Shenzhen, Guangdong (CN)

(72) Inventor: Yong Fan, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 20 days.

(21) Appl. No.: 14/759,368

(22) PCT Filed: Jan. 14, 2015

(86) PCT No.: PCT/CN2015/070693
§ 371 (c)(1),
(2) Date: Jul. 6, 2015

(87) PCT Pub. No.: WO2016/101366
PCT Pub. Date: Jun. 30, 2016

(65) Prior Publication Data
US 2016/0313501 A1    Oct. 27, 2016

(30) Foreign Application Priority Data

Dec. 26, 2014    (CN) .......................... 2014 1 0837208

(51) Int. Cl.
*F21V 8/00*    (2006.01)
(52) U.S. Cl.
CPC ......... *G02B 6/0091* (2013.01); *G02B 6/0026* (2013.01); *G02B 6/0068* (2013.01)

(58) Field of Classification Search
CPC ... G02B 6/0091; G02B 6/0026; G02B 6/0068
See application file for complete search history.

(56) References Cited

U.S. PATENT DOCUMENTS

| | | | | |
|---|---|---|---|---|
| 8,562,200 | B2 * | 10/2013 | Park ..................... | G02B 6/0091 349/58 |
| 2013/0050612 | A1 * | 2/2013 | Hur ................... | G02F 1/133603 349/62 |
| 2013/0265503 | A1 * | 10/2013 | Hosoki ............... | G02B 6/0068 348/790 |
| 2015/0219822 | A1 * | 8/2015 | Lee ..................... | G02B 6/0023 362/608 |

* cited by examiner

*Primary Examiner* — Mary Ellen Bowman
(74) *Attorney, Agent, or Firm* — Andrew C. Cheng

(57) ABSTRACT

The disclosure provides a backlight module and a display device. The backlight module comprises a light guide plate having a first surface and a second surface intersecting with the first surface, a first light bar, a second light bar, and first positioning columns. First positioning holes is formed on the first surface. The first light bar comprises a first substrate arranged close to the first surface, first blue emitting diodes arranged on the first substrate, and first quantum dot fluorescent tubes arranged close to the first surface. The second light bar comprises a second substrate arranged close to the first surface, second blue light emitting diodes arranged on the second substrate, and second quantum dot fluorescent tubes arranged close to the second surface. The first positioning columns are arranged between the first quantum dot fluorescent tubes and the first surface such that a first space is formed there between.

10 Claims, 3 Drawing Sheets

BACKLIGHT MODULE AND DISPLAY DEVICE

CROSS REFERENCE TO RELATED APPLICATIONS

This application claims the benefit of, and priority to, Chinese Patent Application No. 201410837208.9, filed Dec. 26, 2014, titled "Backlight Module and Display Device", the entire contents of which are incorporated by reference herein in its entirety.

FIELD OF THE INVENTION

The disclosure is related to the field of flat display, and more particularly to a backlight module and display device.

BACKGROUND OF THE INVENTION

Liquid crystal display devices are common display devices, and prevail because of the features of low power consumption, small volume and lightweight. The liquid crystal display device usually comprises a backlight module and a display panel. The backlight module is used to provide surface light for the display panel. The backlight module usually comprises a light guide plate and a light source. The light source is usually arranged at the two opposite sides of the light guide plate to provide light to the light guide plate. The light guide plate is used to transform the light emitted from the light source as surface light. When there is expansion to the light guide plate because of being heated or absorbing moisture, the light guide plate extrudes the light source arranged at the tow opposite sides to further damage the light source. Or the light guide plate extrudes the light source arranged at the tow opposite sides of the light guide plate such that the light guide plate is damaged.

SUMMARY OF THE INVENTION

The present disclosure provides a backlight module. The backlight module comprises a light guide plate, a first light bar, a second light bar and plurality of first positioning columns. The light guide plate comprises a first surface and a second surface intersecting with the first surface. A plurality of first positioning holes is formed on the first surface. A first light bar arranged close to the first surface. The first light bar comprises a first substrate, a plurality of first blue emitting diodes, and a plurality of first quantum dot fluorescent tubes. The first substrate is arranged close to the first surface. The first blue emitting diodes are arranged on the surface of the first substrate close to the light guide plate. The first quantum dot fluorescent tubes are arranged between the first blue emitting diodes and the first surface. The second light bar is arranged close to the second surface. The second light bar comprises a second substrate, a plurality of second blue light emitting diodes, and a plurality of second quantum dot fluorescent tubes. The second substrate is arranged close to the second surface. The second blue emitting diodes are arranged on the surface of the second substrate close to the light guide plate. The second quantum dot fluorescent tubes are arranged between the second blue emitting diodes and the second surface. The plurality of first positioning columns is arranged between the first quantum dot fluorescent tubes and the first surface. A part of the first positioning column is received in the first positioning hole such that a first space is formed between the first quantum dot fluorescent tubes and the first surface of the light guide plate.

In one embodiment of the backlight module, the first positioning holes are arranged uniformly on the first surface of the light guide plate, and the first positioning columns are arranged corresponding to the space between the first blue light emitting diodes.

In one embodiment of the backlight module, a plurality of second positioning holes are formed on the second surface of the light guide plate, and the backlight light module further comprises a plurality of second positioning columns arranged between the second quantum dot fluorescent tubes and the second surface. A part of the second positioning column is received in the second positioning hole such that a second space is formed between the second quantum dot fluorescent tubes and the second surface of the light guide plate.

In one embodiment of the backlight module, the second positioning holes are arranged uniformly on the second surface of the light guide plate, and the second positioning columns are arranged corresponding to the space between the second blue light emitting diodes.

In one embodiment of the backlight module, the backlight module further comprises a first elastic portion supporting the third surface of the light guide plate.

By way of configuring a plurality of first positioning holes on the first surface of the light guide plate and by way of coordinating the first positioning columns and the first positioning holes, a first space is formed between the first quantum dot fluorescent tubes and the first surface of the light guide plate to avoid extrusion to the first blue light emitting diodes caused by the expansion due to heat applied on or moisture absorbed by the light guide plate. Thus the first blue light emitting diodes are protected from being damaged. Furthermore, the first positioning holes are arranged uniformly on the first surface of the light guide plate. When there is expansion due to heat applied on or moisture absorbed by the light guide plate, the first positioning columns coordinate with the first positioning holes uniformly formed on the first surface such that the first positioning columns uniformly apply forces on the light guide plate to prevent the damage on the light guide plate caused by uneven force. Furthermore, one end of the first positioning column is received in the first position hole, and the other end supports the first quantum dot fluorescent tubes to ensure a minimum distance between the first light bar and the first surface of the light guide plate. The optical coupling efficiency of the light beam entering to the first surface of the light guide plate is increased, and the leakage of the light emitted from the first light bar is decreased. Furthermore, the first positioning columns are arranged corresponding to the space between the first blue light emitting diodes such that the light blocked by the first positioning columns are reduced and the optical coupling efficiency of the light beam entering to the first surface of the light guide plate is increased.

In another aspect, the present disclosure provides a display device comprising backlight module. The backlight module comprises a light guide plate, a first light bar, a second light bar and plurality of first positioning columns. The light guide plate comprises a first surface and a second surface intersecting with the first surface. A plurality of first positioning holes is formed on the first surface. A first light bar arranged close to the first surface. The first light bar comprises a first substrate, a plurality of first blue emitting diodes, and a plurality of first quantum dot fluorescent tubes.

The first substrate is arranged close to the first surface. The first blue emitting diodes are arranged on the surface of the first substrate close to the light guide plate. The first quantum dot fluorescent tubes are arranged between the first blue emitting diodes and the first surface. A second light bar is arranged close to the second surface. The second light bar comprises a second substrate, a plurality of second blue light emitting diodes, and a plurality of second quantum dot fluorescent tubes. The second substrate is arranged close to the second surface. The second blue emitting diodes are arranged on the surface of the second substrate close to the light guide plate. The second quantum dot fluorescent tubes are arranged between the second blue emitting diodes and the second surface. The plurality of first positioning columns is arranged between the first quantum dot fluorescent tubes and the first surface. A part of the first positioning column is received in the first positioning hole such that a first space is formed between the first quantum dot fluorescent tubes and the first surface of the light guide plate.

In one embodiment of the display device, the first positioning holes are arranged uniformly on the first surface of the light guide plate, and the first positioning columns are arranged corresponding to the space between the first blue light emitting diodes.

In one embodiment of the display device, a plurality of second positioning holes are formed on the second surface of the light guide plate, and the backlight light module further comprises a plurality of second positioning columns arranged between the second quantum dot fluorescent tubes and the second surface. A part of the second positioning column is received in the second positioning hole such that a second space is formed between the second quantum dot fluorescent tubes and the second surface of the light guide plate.

In one embodiment of the display device, the second positioning holes are arranged uniformly on the second surface of the light guide plate, and the second positioning columns are arranged corresponding to the space between the second blue light emitting diodes.

In one embodiment of the display device, the backlight module further comprises a first elastic portion supporting the third surface of the light guide plate.

BRIEF DESCRIPTION OF THE DRAWINGS

In order to more clearly illustrate the prior art or the embodiments or aspects of the practice of the disclosure, the accompanying drawings for illustrating the prior art or the embodiments of the disclosure are briefly described as below. It is apparently that the drawings described below are merely some embodiments of the disclosure, and those skilled in the art may derive other drawings according the drawings described below without creative endeavor.

DETAILED DESCRIPTION OF PREFERRED EMBODIMENTS

The following description with reference to the accompanying drawings is provided to clearly and completely explain the exemplary embodiments of the disclosure. It is apparent that the following embodiments are merely some embodiments of the disclosure rather than all embodiments of the disclosure. According to the embodiments in the disclosure, all the other embodiments attainable by those skilled in the art without creative endeavor belong to the protection scope of the disclosure.

Figure 1:
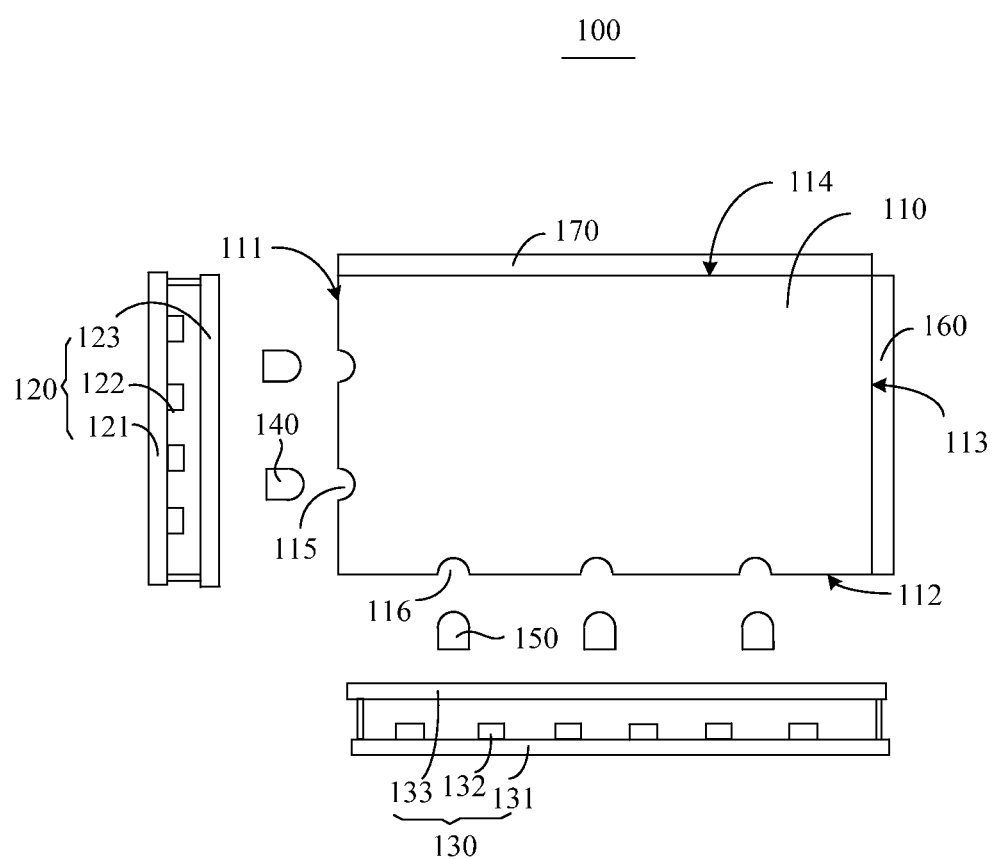
FIG. 1 is a schematic three-dimensional explosion view of the backlight module according to one embodiment of the disclosure.
Figure 2:
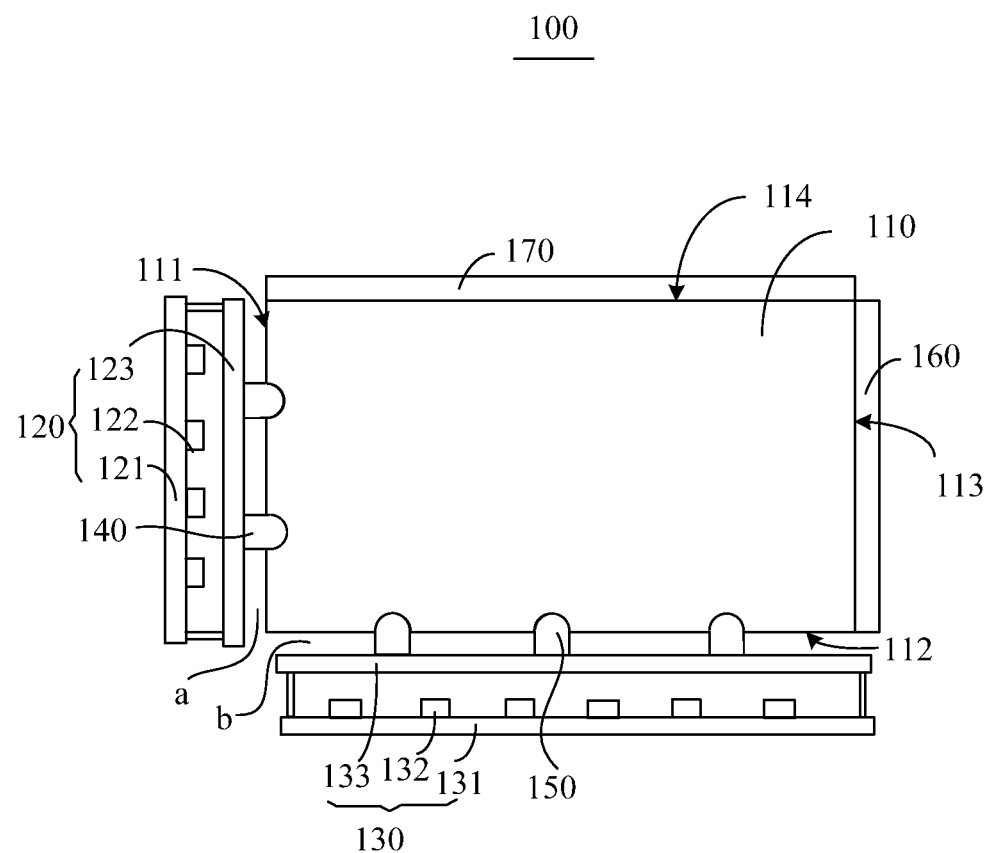
FIG. 2 is a schematic diagram for the assembly of the display device according to one embodiment of the disclosure.

Refer to FIG. 1 and FIG. 2 together. FIG. 1 is a schematic three-dimensional explosion view of the backlight module according to one embodiment of the disclosure. FIG. 2 is a schematic diagram for the assembly of the display device according to one embodiment of the disclosure. The backlight module 100 comprises a light guide plate 110, a first light bar 120, a second light bar 130 and a plurality of first positioning columns 140. The light guide plate 110 comprises a first surface 111 and a second surface 112 intersecting with the first surface 111. A plurality of first positioning holes 115 is formed on the first surface 111. The first light bar 120 is arranged close to the first surface 111. The first light bar 120 comprises a first substrate 121, a plurality of first blue emitting diodes, 122 and a plurality of first quantum dot fluorescent tubes 123. The first substrate 121 is arranged close to the first surface 111. The first blue light emitting diodes 122 are arranged on the surface of the first substrate 121 close to the light guide plate 110. The first quantum dot fluorescent tubes 123 are arranged between the first blue light emitting diodes 122 and the first surface 111. The second light bar 130 is arranged close to the second surface 112. The second light bar 130 comprises a second substrate 131, a plurality of second blue light emitting diodes 132, and a plurality of second quantum dot fluorescent tubes 133. The second substrate 131 is arranged close to second surface 112. The second blue light emitting diodes 132 are arranged on the surface of the second substrate 121 close to the light guide plate 110. The second quantum dot fluorescent tubes 133 are arranged between the second blue light emitting diodes 132 and the second surface 112. The first positioning columns 140 are arranged between the first quantum dot fluorescent tubes 123 and the first surface 111. A part of the first positioning column 140 is received in the first positioning hole 115 such that a first space a is formed between the first quantum dot fluorescent tubes 123 and the first surface 111 of the light guide plate 110.

In one embodiment of the backlight module, the first positioning holes 115 are arranged uniformly on the first surface 111 of the light guide plate 110. The first positioning columns 140 are arranged corresponding to the space between the first blue light emitting diodes 122. In one embodiment, one end of the first positioning column 140 is received in the first position hole 115, and the other end of the first positioning column 140 supports the first quantum dot fluorescent tubes 123. In this embodiment, the first positioning column 140 is made from transparent material.

By way of configuring a plurality of first positioning holes 115 on the first surface 111 of the light guide plate 110 and by way of coordinating the first positioning columns 140 and the first positioning holes 115, a first space a is formed between the first quantum dot fluorescent tubes 123 and the first surface 111 of the light guide plate 110 to avoid extrusion to the first blue light emitting diodes 122 caused by the expansion due to heat applied on or moisture absorbed by the light guide plate 110. Thus the first blue light emitting diodes 122 are protected from being damaged. Furthermore, the first positioning holes 115 are arranged uniformly on the first surface 111 of the light guide plate 110. When there is expansion due to heat applied on or moisture absorbed by the light guide plate 110, the first positioning columns 140 coordinate with the first positioning holes 115 uniformly formed on the first surface 111 such that the first positioning columns 140 uniformly apply forces on the light guide plate 110 to prevent the damage on the light guide plate 110 caused by uneven force. Furthermore, one end of the first positioning column 140 is received in the first position hole 115, and the other end supports the first quantum dot fluorescent tubes 123 to ensure a minimum distance between the first light bar 120 and the first surface 111 of the light guide plate 110. The optical coupling efficiency of the light beam entering to the first surface 111 of the light guide plate 110 is increased, and the leakage of the light emitted from the first light bar 120 is decreased. Furthermore, the first positioning columns 140 are arranged corresponding to the space between the first blue light emitting diodes 122 such that the light blocked by the first positioning columns 140 are reduced and the optical coupling efficiency of the light beam entering to the first surface 111 of the light guide plate 110 is increased.

A plurality of second positioning holes 116 is formed on the second surface 112 of the light guide 110. Correspondingly, the backlight module 100 further comprises a plurality of second positioning holes 150. The second positioning columns 150 are arranged between the second quantum dot fluorescent tubes 133 and the second surface 112. A part of the second positioning column 150 is received in the second positioning hole 116 such that a second space b is formed between the second quantum dot fluorescent tubes 133 and the second surface 112 of the light guide plate 110. In one embodiment, the second positioning holes 116 are arranged uniformly on the second surface 112 of the light guide plate 110, and the second positioning columns 150 are arranged corresponding to the space between the second blue light emitting diodes 132. In one embodiment, one end of the first positioning column 140 is received in the second position hole 116, and the other end of the second positioning column 150 supports the second quantum dot fluorescent tubes 123. In this embodiment, the second positioning column 150 is made from transparent material.

By way of configuring a plurality of second positioning holes 116 on the second surface 112 of the light guide plate 110 and by way of coordinating the second positioning columns 150 and the second positioning holes 116, a second space b is formed between the second quantum dot fluorescent tubes 132 and the second surface 112 of the light guide plate 110 to avoid extrusion to the second blue light emitting diodes 132 caused by the expansion due to heat applied on or moisture absorbed by the light guide plate 110. Thus the second blue light emitting diodes 132 are protected from being damaged. Furthermore, the second positioning holes 116 are arranged uniformly on the second surface 112 of the light guide plate 110. When there is expansion due to heat applied on or moisture absorbed by the light guide plate 110, the second positioning columns 150 coordinate with the second positioning holes 116 uniformly formed on the second surface 112 such that the second positioning columns 150 uniformly apply forces on the light guide plate 110 to prevent the damage on the light guide plate 110 caused by uneven force. Furthermore, one end of the second positioning column 150 is received in the second position hole 116, and the other end supports the second quantum dot fluorescent tubes 133 to ensure a minimum distance between the second light bar 130 and the second surface 112 of the light guide plate 110. The optical coupling efficiency of the light beam entering to the second surface 112 of the light guide plate 110 is increased, and the leakage of the light emitted from the second light bar 130 is decreased. Furthermore, the first positioning columns 140 are arranged corresponding to the space between the second blue light emitting diodes 132 such that the light blocked by the second positioning columns 150 are reduced and the optical coupling efficiency of the light beam entering to the second surface 112 of the light guide plate 110 is increased.

The light guide plate 110 further comprises a third surface 113 opposite to the first surface 111. The backlight module 100 further comprises a first elastic part 160. The first elastic part 160 may shrink when it is extruded. The first elastic part 160 supports the third surface 113 of the light guide plate 110. In the embodiment, the material of the first elastic part 160 is rubber. When the light guide plate 110 has expansion because of being heated or absorbing moisture, the first positioning column 115 arranged close to the first surface 111 stops the light guide plate 110 from extruding the first light bar 120 from the first surface 111. At this time, the light guide plate 110 extrudes the first elastic part 160 from the third surface 113. Because the first elastic part 160 has elasticity for shrinking when being extruded, the first elastic part 160 or the light guide plate 110 is protected from being damaged to some extent.

The light guide plate 110 further comprises a forth surface 114 opposite to the second surface 112. The backlight module 100 further comprises a second elastic part 170. The second elastic part 170 supports the forth surface 114 of the light guide plate 110 when the second elastic part 170 shrinks due to the extrusion. In the embodiment, the material of the second elastic part 170 is rubber. When the light guide plate 110 has expansion because of being heated or absorbing moisture, the second positioning columns 150 close to the second surface 112 stops the light guide plate 110 from extruding the second light bar 130 from the second surface 112. At this time, the light guide plate 110 extrudes the second elastic part 170 from the third surface 113. Because the second elastic part 170 has elasticity for shrinking when being extruded, the light guide plate 110 is protected from being damaged to some extent.

Figure 3:
FIG. 3 is a schematic structure of the display device according to one embodiment of the disclosure.
Figure 3:
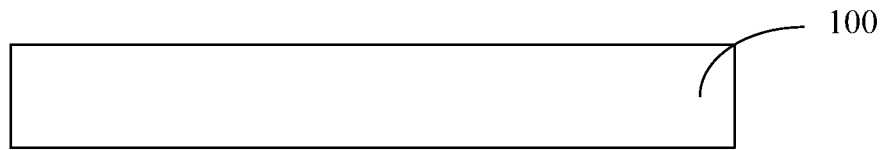

The display device is introduced as below in conjunction with FIG. 1 and FIG. 2. Refer to FIG. 3. FIG. 3 is a schematic structure of the display device according to one embodiment of the disclosure. The display device 10 comprises the backlight module 100 as shown in FIG. 1 and a display panel 200. The backlight module 100 is used to provide surface light source to the display panel 200.

The backlight module 100 comprises a light guide plate 110, a first light bar 120, a second light bar 130 and a plurality of first positioning columns 140. The light guide plate 110 comprises a first surface 111 and a second surface 112 intersecting with the first surface 111. A plurality of first positioning holes 115 is formed on the first surface 111. The first light bar 120 is arranged close to the first surface 111. The first light bar 120 comprises a first substrate 121, a plurality of first blue emitting diodes, 122 and a plurality of first quantum dot fluorescent tubes 123. The first substrate 121 is arranged close to the first surface 111. The first blue light emitting diodes 122 are arranged on the surface of the first substrate 121 close to the light guide plate 110. The first quantum dot fluorescent tubes 123 are arranged between the first blue light emitting diodes 122 and the first surface 111. The second light bar 130 is arranged close to the second surface 112. The second light bar 130 comprises a second substrate 131, a plurality of second blue light emitting diodes 132, and a plurality of second quantum dot fluorescent tubes 133. The second substrate 131 is arranged close to second surface 112. The second blue light emitting diodes 132 are arranged on the surface of the second substrate 121 close to the light guide plate 110. The second quantum dot fluorescent tubes 133 are arranged between the second blue light emitting diodes 132 and the second surface 112. The first positioning columns 140 are arranged between the first quantum dot fluorescent tubes 123 and the first surface 111. A part of the first positioning column 140 is received in the first positioning hole 115 such that a first space a is formed between the first quantum dot fluorescent tubes 123 and the first surface 111 of the light guide plate 110.

In one embodiment of the backlight module, the first positioning holes 115 are arranged uniformly on the first surface 111 of the light guide plate 110. The first positioning columns 140 are arranged corresponding to the space between the first blue light emitting diodes 122. In one embodiment, one end of the first positioning column 140 is received in the first position hole 115, and the other end of the first positioning column 140 supports the first quantum dot fluorescent tubes 123. In this embodiment, the first positioning column 140 is made from transparent material.

By way of configuring a plurality of first positioning holes 115 on the first surface 111 of the light guide plate 110 and by way of coordinating the first positioning columns 140 and the first positioning holes 115, a first space a is formed between the first quantum dot fluorescent tubes 123 and the first surface 111 of the light guide plate 110 to avoid extrusion to the first blue light emitting diodes 122 caused by the expansion due to heat applied on or moisture absorbed by the light guide plate 110. Thus the first blue light emitting diodes 122 are protected from being damaged. Furthermore, the first positioning holes 115 are arranged uniformly on the first surface 111 of the light guide plate 110. When there is expansion due to heat applied on or moisture absorbed by the light guide plate 110, the first positioning columns 140 coordinate with the first positioning holes 115 uniformly formed on the first surface 111 such that the first positioning columns 140 uniformly apply forces on the light guide plate 110 to prevent the damage on the light guide plate 110 caused by uneven force. Furthermore, one end of the first positioning column 140 is received in the first position hole 115, and the other end supports the first quantum dot fluorescent tubes 123 to ensure a minimum distance between the first light bar 120 and the first surface 111 of the light guide plate 110. The optical coupling efficiency of the light beam entering to the first surface 111 of the light guide plate 110 is increased, and the leakage of the light emitted from the first light bar 120 is decreased. Furthermore, the first positioning columns 140 are arranged corresponding to the space between the first blue light emitting diodes 122 such that the light blocked by the first positioning columns 140 are reduced and the optical coupling efficiency of the light beam entering to the first surface 111 of the light guide plate 110 is increased.

A plurality of second positioning holes 116 is formed on the second surface 112 of the light guide 110. Correspondingly, the backlight module 100 further comprises a plurality of second positioning holes 150. The second positioning columns 150 are arranged between the second quantum dot fluorescent tubes 133 and the second surface 112. A part of the second positioning column 150 is received in the second positioning hole 116 such that a second space b is formed between the second quantum dot fluorescent tubes 133 and the second surface 112 of the light guide plate 110. In one embodiment, the second positioning holes 116 are arranged uniformly on the second surface 112 of the light guide plate 110, and the second positioning columns 150 are arranged corresponding to the space between the second blue light emitting diodes 132. In one embodiment, one end of the first positioning column 140 is received in the second position hole 116, and the other end of the second positioning column 150 supports the second quantum dot fluorescent tubes 123. In this embodiment, the second positioning column 150 is made from transparent material.

By way of configuring a plurality of second positioning holes 116 on the second surface 112 of the light guide plate 110 and by way of coordinating the second positioning columns 150 and the second positioning holes 116, a second space b is formed between the second quantum dot fluorescent tubes 132 and the second surface 112 of the light guide plate 110 to avoid extrusion to the second blue light emitting diodes 132 caused by the expansion due to heat applied on or moisture absorbed by the light guide plate 110. Thus the second blue light emitting diodes 132 are protected from being damaged. Furthermore, the second positioning holes 116 are arranged uniformly on the second surface 112 of the light guide plate 110. When there is expansion due to heat applied on or moisture absorbed by the light guide plate 110, the second positioning columns 150 coordinate with the second positioning holes 116 uniformly formed on the second surface 112 such that the second positioning columns 150 uniformly apply forces on the light guide plate 110 to prevent the damage on the light guide plate 110 caused by uneven force. Furthermore, one end of the second positioning column 150 is received in the second position hole 116, and the other end supports the second quantum dot fluorescent tubes 133 to ensure a minimum distance between the second light bar 130 and the second surface 112 of the light guide plate 110. The optical coupling efficiency of the light beam entering to the second surface 112 of the light guide plate 110 is increased, and the leakage of the light emitted from the second light bar 130 is decreased. Furthermore, the first positioning columns 140 are arranged corresponding to the space between the second blue light emitting diodes 132 such that the light blocked by the second positioning columns 150 are reduced and the optical coupling efficiency of the light beam entering to the second surface 112 of the light guide plate 110 is increased.

The light guide plate 110 further comprises a third surface 113 opposite to the first surface 111. The backlight module 100 further comprises a first elastic part 160. The first elastic part 160 may shrink when it is extruded. The first elastic part 160 supports the third surface 113 of the light guide plate 110. In the embodiment, the material of the first elastic part 160 is rubber. When the light guide plate 110 has expansion because of being heated or absorbing moisture, the first positioning column 115 arranged close to the first surface 111 stops the light guide plate 110 from extruding the first light bar 120 from the first surface 111. At this time, the light guide plate 110 extrudes the first elastic part 160 from the third surface 113. Because the first elastic part 160 has elasticity for shrinking when being extruded, the first elastic part 160 or the light guide plate 110 is protected from being damaged to some extent.

Note that the specifications relating to the above embodiments should be construed as exemplary rather than as limitative of the present disclosure. The equivalent variations and modifications on the structures or the process by reference to the specification and the drawings of the disclosure, or application to the other relevant technology fields directly or indirectly should be construed similarly as falling within the protection scope of the disclosure.

What is claimed is:

1. A backlight module, comprising:
a light guide plate comprising a first surface and a second surface intersecting with the first surface, wherein a plurality of first positioning holes is formed on the first surface;
a first light bar arranged close to the first surface, the first light bar comprising a first substrate, a plurality of first blue emitting diodes, and a plurality of first quantum dot fluorescent tubes, the first substrate arranged close to the first surface, the first blue emitting diodes arranged on the surface of the first substrate close to the light guide plate, the first quantum dot fluorescent tubes arranged between the first blue emitting diodes and the first surface;
a second light bar arranged close to the second surface, the second light bar comprising a second substrate, a plurality of second blue light emitting diodes, and a plurality of second quantum dot fluorescent tubes, the second substrate arranged close to the second surface, the second blue emitting diodes arranged on the surface of the second substrate close to the light guide plate, the second quantum dot fluorescent tubes arranged between the second blue emitting diodes and the second surface; and
a plurality of first positioning columns, arranged between the first quantum dot fluorescent tubes and the first surface, one end of each of the first positioning columns being received in a corresponding one of the first positioning holes formed on the first surface and the other end of the first positioning column being contacted with the first quantum dot fluorescent tubes such that a first space is formed between the first quantum dot fluorescent tubes and the first surface of the light guide plate;
wherein the backlight module further comprises a first elastic portion contacted with a third surface of the light guide plate, and the third surface is opposite to the first surface.

2. The backlight module according to claim 1, wherein the first positioning holes are arranged uniformly on the first surface of the light guide plate, and the first positioning columns are arranged corresponding to the space between the first blue light emitting diodes.

3. The backlight module according to claim 1, wherein a plurality of second positioning holes are formed on the second surface of the light guide plate, and the backlight light module further comprises a plurality of second positioning columns arranged between the second quantum dot fluorescent tubes and the second surface; wherein a part of the second positioning column is received in the second positioning hole such that a second space is formed between the second quantum dot fluorescent tubes and the second surface of the light guide plate.

4. The backlight module according to claim 3, wherein the second positioning holes are arranged uniformly on the second surface of the light guide plate, and the second positioning columns are arranged corresponding to the space between the second blue light emitting diodes.

5. The backlight module according to claim 1, wherein a material of the first elastic portion is rubber.

6. A display device comprising:
a backlight module comprising:
a light guide plate comprising a first surface and a second surface intersecting with the first surface, wherein a plurality of first positioning holes is formed on the first surface;
a first light bar arranged close to the first surface, the first light bar comprising a first substrate, a plurality of first blue emitting diodes, and a plurality of first quantum dot fluorescent tubes, the first substrate arranged close to the first surface, the first blue emitting diodes arranged on the surface of the first substrate close to the light guide plate, the first quantum dot fluorescent tubes arranged between the first blue emitting diodes and the first surface;
a second light bar arranged close to the second surface, the second light bar comprising a second substrate, a plurality of second blue light emitting diodes, and a plurality of second quantum dot fluorescent tubes, the second substrate arranged close to the second surface, the second blue emitting diodes arranged on the surface of the second substrate close to the light guide plate, the second quantum dot fluorescent tubes arranged between the second blue emitting diodes and the second surface; and
a plurality of first positioning columns, arranged between the first quantum dot fluorescent tubes and the first surface, one end of each of the first positioning columns being received in a corresponding one of the first positioning holes formed on the first surface and the other end of the first positioning column being contacted with the first quantum dot fluorescent tubes such that a first space is formed between the first quantum dot fluorescent tubes and the first surface of the light guide plate;
wherein the backlight module further comprises a first elastic portion contacted with a third surface of the light guide plate, and the third surface is opposite to the first surface.

7. The display device according to claim 6, wherein the first positioning holes are arranged uniformly on the first surface of the light guide plate, and the first positioning columns are arranged corresponding to the space between the first blue light emitting diodes.

8. The display device according to claim 6, wherein a plurality of second positioning holes are formed on the second surface of the light guide plate, and the backlight light module further comprises a plurality of second positioning columns arranged between the second quantum dot fluorescent tubes and the second surface; wherein a part of the second positioning column is received in the second positioning hole such that a second space is formed between the second quantum dot fluorescent tubes and the second surface of the light guide plate.

9. The display device according to claim 8, wherein the second positioning holes are arranged uniformly on the second surface of the light guide plate, and the second positioning columns are arranged corresponding to the space between the second blue light emitting diodes.

10. The display device according to claim 6, wherein a material of the first elastic portion is rubber.

* * * * *